Aug. 30, 1955  H. L. SUGG  2,716,258

POWER APPLYING UNIT FOR THE CLAMP NUT OF A TIRE MOLD

Filed July 13, 1951  3 Sheets-Sheet 1

INVENTOR.
HAROLD L. SUGG
BY
Cook & Robinson
ATTORNEYS

Aug. 30, 1955 H. L. SUGG 2,716,258
POWER APPLYING UNIT FOR THE CLAMP NUT OF A TIRE MOLD
Filed July 13, 1951 3 Sheets-Sheet 3

INVENTOR.
HAROLD L. SUGG
BY
Cook + Robinson
ATTORNEYS

United States Patent Office 2,716,258
Patented Aug. 30, 1955

2,716,258

POWER APPLYING UNIT FOR THE CLAMP NUT OF A TIRE MOLD

Harold L. Sugg, Wenatchee, Wash.

Application July 13, 1951, Serial No. 236,530

2 Claims. (Cl. 18—18)

This invention relates to improvements in molds of those kinds now extensively used for the re-treading and capping of truck and automobile tires, and which are typified by that mold disclosed in U. S. Patent No. 2,147,339. More particularly the invention relates to a power drive for use in connection with molds of the kind or type of that of the patent mentioned, to make possible an easy, quick mechanical turning of the clamping nut as applied to the center clamp shaft or screw of such molds, for the clamping of the pressure plates against the complemental matrices between which the tire to be treated is disposed.

It will here be explained that in the common types of tire molds for which the present invention is designed for use, there is an annular heating chamber within which the tire to be capped is horizontally disposed. Upper and lower matrices are applied to the tire and pressure plates are arranged to engage against upper and lower sides of the assembled tire and matrices. Then, by means of a center clamp the pressure plates are drawn toward each other to clamp the matrices against the opposite faces of the tire. The center clamp comprises a screw shaft that is adapted to be locked at its lower end in the lower pressure plate and to slide through a hub bore in the upper pressure plate, and a nut is applied to this screw shaft to engage with the upper end surface of the hub portion of the upper pressure plate for the drawing of the plates together.

Due to the fact that an exceedingly high pressure must be applied by the matrices against the tire, it is a hard, tiring and time consuming operation to turn down the clamp nut, to obtain the necessary or desired clamping pressure. To my knowledge the turning of the clamp nut has always been manually done.

In view of the difficulties and disadvantages of the manual clamping operation, it has been the primary object of this invention to provide a simple, practical and easily applied power drive for molds of the above stated character, as a means for the mechanical turning of the clamp nut, thus to eliminate the hard, tedious and slow manual work, and to accomplish the desired clamping results easily and quickly.

It is a further object of the invention to provide a unitary power drive, or power transmission gearing, that can be easily and readily applied to the present day types of tire molds for the mechanical operation of the clamp nut, but which will not interfere with manual turning of the clamp nut in the usual way should this be desired or necessary, nor will it in any way interfere with the normal manner of use of the mold.

Still further objects of my invention reside in the details of construction and combination of parts embodied in the present power drive unit, and in its mode of application to the mold, as will hereinafter be fully described.

In accomplishing these and other objects of the invention, I have provided the improved details of construction, the preferred forms of which are illustrated in the accompanying drawings, wherein—

Referring more in detail to the drawings—

Figure 1:
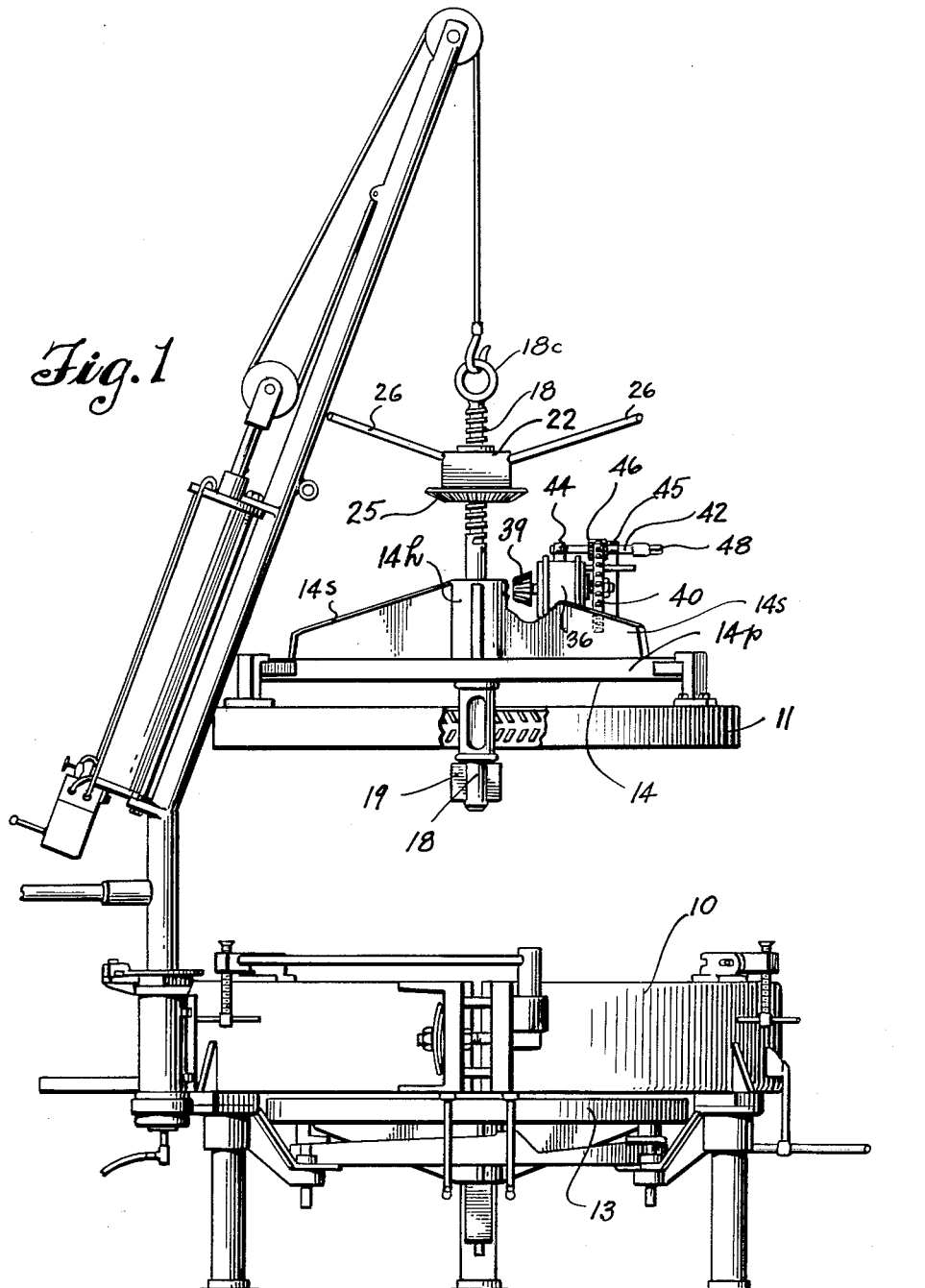
Fig. 1 is a side view of a tire mold shown in an open condition, with a power drive unit for mechanically turning the clamp nut applied to the upper clamping plate.
Figure 2:
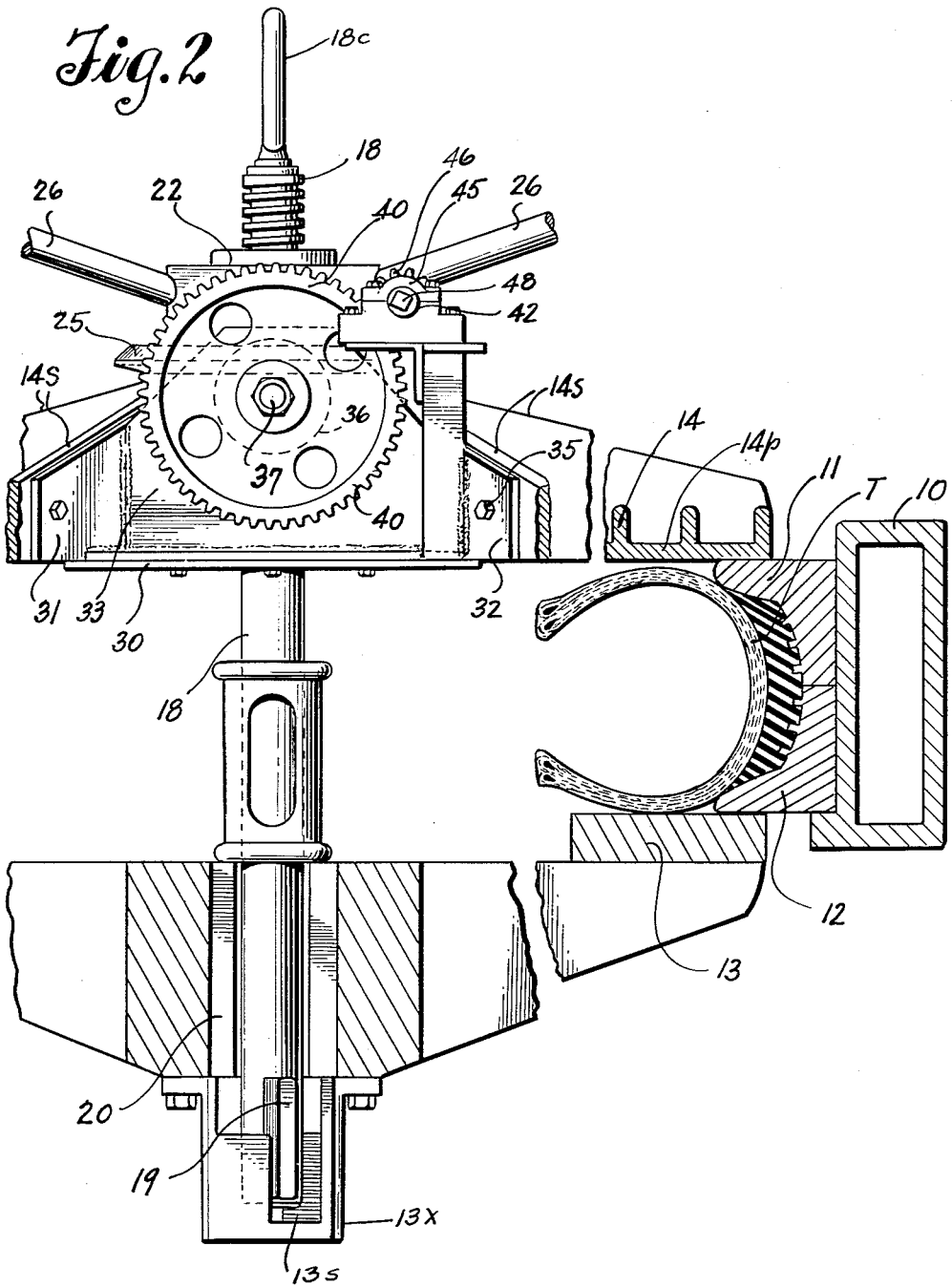
Fig. 2 is a vertical sectional detail of parts of a tire mold, showing the relationship of upper and lower pressure plates to the complemental matrices and their application to the tire, and showing also the power drive unit as applied to the upper press plate for turning the clamp nut of the center clamp.
Figure 4:
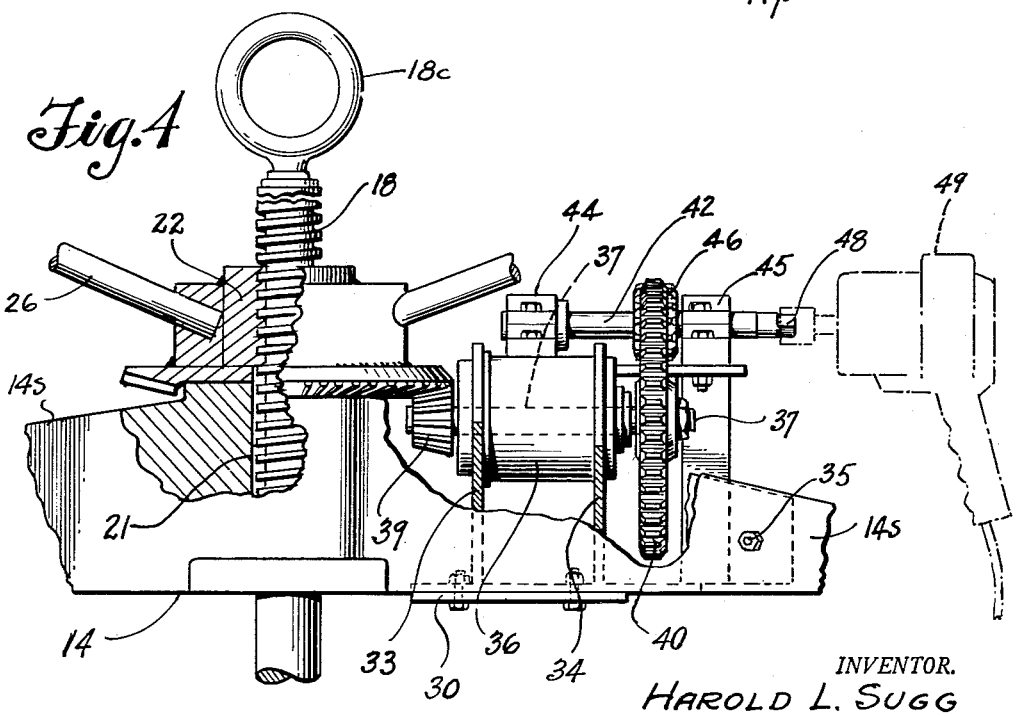
Fig. 4 is a side view of the same, showing the drive gear of the unit in driving mesh with the driving gear that is secured to the clamp nut.

In Fig. 1, I have shown in side view, a tire mold that is typical of those for which the present power drive is intended to be used. The mold includes an annular heating chamber 10, in which a tire, T, as held between complemental upper and lower matrices, 11 and 12, as disposed for the capping or treating operation, as is well understood in the art. Such disposition of the tire between matrices is best shown in Fig. 2 of the present drawings. Below the heating chamber is a horizontally disposed pressure plate 13 adapted, for its clamping operation, to engage about its peripheral portion with the lower matrix 12, as noted in Fig. 2. Likewise, there is an upper pressure plate 14 designed to similarly engage against the upper matrix 11. The center clamp comprises a clamp screw whereby the pressure plates can be drawn together. This screw is designated by numeral 18, and it is shown to be equipped at its lower end with a cross-bar 19, that is adapted to be passed downwardly through a key-hole slot 20 in the hub portion of the lower pressure plate, then, by turning the shaft, to be disposed cross-wise of the slot, thus to anchor the lower end of the screw shaft in the plate. When the cross bar 19 passes from the lower end of the key hole slot 20 it is received in a housing 13x that is fixed to the under side of the lower pressure plate as seen in Fig. 2 and which has shoulders 13s against which the ends of the cross bar engage to prevent rotation of the shaft 18 while the nut at its upper end is being tightened. The screw shaft extends freely through a hub passage 21 of the upper pressure plate 14 and has a clamp nut 22 threaded thereon, as best shown in Fig. 4. The nut 22 is integral with, or is welded or otherwise secured concentrically to the top side of a downwardly facing bevel gear 25. In a clamping operation, the lower face of the gear 25 engages flatly against the upper end surface of the hub portion of the upper pressure plate 14. However, in opening the mold, the gear 25 can be lifted free of its driving gear as seen in Fig. 1. For lifting the pressure plate 14 through the mediacy of shaft 18, the shaft is equipped at its upper end with an eyelet 18c to which a lifting cable can be readily attached.

It is desirable and practical that the nut 22 be equipped with a plurality of radially extended turning levers 26 as in the present day machines so that it can be adjusted manually if such is desired.

It will further be explained that it is present day practise to cast the pressure plates in circular form, with a plurality of ribs or spokes extended radially from the hub portion and integrally formed with a horizontal, annular plate at their outer ends. In view of this form of construction, two adjacent ribs are used as the mounting means for the power drive unit, presently described, as will be best understood by reference to Fig. 3. In this view, the hub portion of the pressure plate is designated by reference character 14h, the ribs or spokes by 14s and the annular peripheral plate, by 14p.

Figure 3:
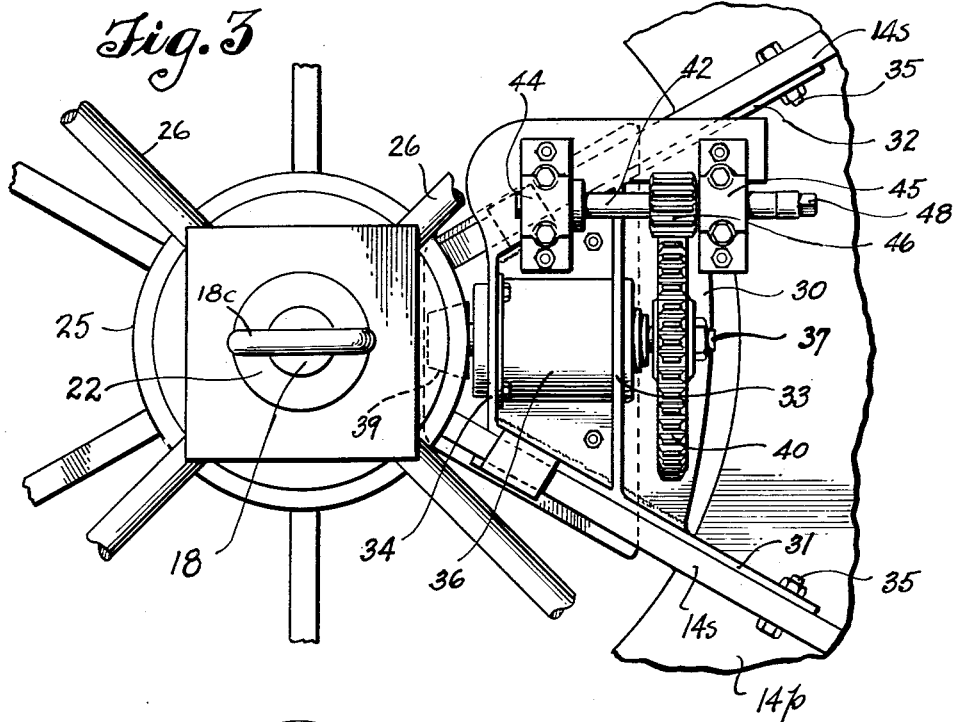
Fig. 3 is a top view of the power drive embodied by the present invention as applied to the radial members of the clamp plate.

The power drive embodied by the present invention is of unitary construction and comprises a frame structure that can readily be bolted or otherwise rigidly secured to the upper pressure plate 14 as shown in Figs. 3 and 4. The frame of the unit comprises a horizontal bottom plate 30 to which two diverging, vertical webs 31 and 32 are welded. Extended directly between and rigidly joining the plates 31 and 32, are vertical and spaced plates 33 and 34. In applying this unitary mechanism to the upper pressure plate 14, the plates 31 and 32 which are arranged to diverge at the same angle as do the ribs or spokes 14s of the pressure plate 14 are disposed between and flatly against adjacent radial ribs 14s, as in Fig. 3, and are secured thereto by bolts, as at 35, or by any other suitable means, so as to rigidly and securely attach the unit. Rigidly fixed in the frame plates 33 and 34, radially of the plate 14 as in Figs. 3 and 4, is a tubular bearing 36 and rotatably mounted coaxially therein is a power transmission shaft 37 which has its opposite end portions extended from the opposite ends of the bearing. Fixed on the inner end of the shaft 37 is a bevel gear pinion 39 and keyed on the outer end is a relatively large driving gear wheel 39. The bevel gear 40 is adapted to be operatively meshed with the bevel gear 25 on the nut, as in Fig. 4 for the turning of the latter.

Also rotatably mounted in the frame structure of the power unit, is shaft 42. This is supported parallel to shaft 37 in frame bearings 44 and 45. Keyed on this shaft is a gear pinion 46 in driving mesh with gear 40. At its outer end the shaft 42 has a squared head 48 to which a socketed head applied to the end of the drive shaft of an electric or air driven drill can be applied for turning the shaft 42. In Fig. 4 an air driven drill has been indicated in dotted lines by numeral 49.

It is not the intent that the present power equipment be confined to any particular make or mold, or that the mechanism itself be confined to the exact details of construction shown, or that it be confined to any specific manner or means for its attachment to the pressure plate 14. It is readily apparent power transmitting gearing could be designed with different gear ratio if so desired.

The inventive concept of this disclosure is believed to reside in the provision of a unitary power unit that is readily and easily applicable to the pressure plate of the mold for the turning of the nut driving gear 25, and which unit does not interfere with manually turning the nut if such is desired.

It is quite readily apparent that with the power unit applied to the pressure plate as in Fig. 1, the manner of use of mold can be exactly in accordance with its previous and intended use except for the additional provision for the driving of the nut 22 through the power unit. The squared head 48 on shaft 42 permits ready application of various kinds of power drills or other kinds of mechanically driven units. In an emergency it permits use of an ordinary carpenter's hand brace for this turning operation.

By use of the present power drive, the long and tedious job of clamping the molds is eliminated. More work can be accomplished and thus there is a substantial saving in cost of work done.

Having thus described my invention, what I claim as new therein and desire to secure by Letters Patent, is:

1. In a tire mold of the character described including a clamp plate adapted to be lifted from and lowered onto the mold, a vertical screw shaft extended freely through the clamp plate and equipped at its lower end with an anchoring means adapted to be releasably engaged with the mold to secure the screw shaft for a clamping operation and against turning serving when released from the mold for the lifting of the plate from the mold and equipped at its upper end with means for the attachment of a lifting member thereto, and a nut threaded on the screw shaft and equipped with means for manual adjustment from and against the plate when the shaft is secured for a clamping operation; a reduction gear train mounted on the clamp plate having means at one end to which a power drive can be applied and having a pinion gear at its other end, and said nut having a turning gear thereon adapted to be lifted from mesh with said pinion gear by the lifting of the screw shaft and to be engaged in mesh with said pinion gear by the lowering of the said screw shaft for the transmission of tightening force from the power drive to the nut through the meshing gears.

2. A combination as recited in claim 1 wherein the said pinion gear and said turning gear on the nut are beveled and the gear on said nut is above the pinion gear to permit its being lifted from and lowered into mesh with the pinion gear with the lifting and lowering of the clamp plate through the mediacy of the shaft and wherein the screw shaft is equipped at its upper end with eyelet or the attachment of a lifting member thereto and said nut is equipped with handles for manual rotation.

References Cited in the file of this patent

UNITED STATES PATENTS

| Number | Name | Date |
|---|---|---|
| 214,540 | Wilkes | Apr. 22, 1879 |
| 767,315 | Sneed | Aug. 9, 1904 |
| 1,576,234 | Cozzoli | Mar. 9, 1926 |
| 1,803,595 | Catoldo | May 5, 1931 |
| 1,819,704 | Friz | Aug. 18, 1931 |
| 2,147,339 | Glynn | Feb. 14, 1939 |
| 2,375,784 | Glynn | May 15, 1945 |
| 2,474,542 | McCloud et al. | June 28, 1949 |

FOREIGN PATENTS

| Number | Country | Date |
|---|---|---|
| 119,784 | Australia | Mar. 27, 1945 |